United States Patent [19]
Seto et al.

[11] Patent Number: 6,088,229
[45] Date of Patent: Jul. 11, 2000

[54] ELECTRONIC APPARATUS HAVING A LOCKING DEVICE FOR PREVENTING THEFT OF MEMORY CARDS AND DISK DRIVE

[75] Inventors: Masaru Seto; Atsushi Tatemichi, both of Tokyo, Japan

[73] Assignee: Kabushiki Kaisha Toshiba, Kawasaki, Japan

[21] Appl. No.: 09/047,939

[22] Filed: Mar. 26, 1998

[30] Foreign Application Priority Data

Apr. 14, 1997 [JP] Japan .................................... 9-095977

[51] Int. Cl.⁷ ...................................................... H05K 7/16
[52] U.S. Cl. .......................... 361/726; 361/725; 361/724; 70/58; 70/59
[58] Field of Search ..................... 361/725, 726, 361/724; 70/58, 59

[56] References Cited

U.S. PATENT DOCUMENTS

| | | | |
|---|---|---|---|
| 5,305,621 | 4/1994 | Broadwater | 70/14 |
| 5,394,713 | 3/1995 | Harmon | 70/58 |
| 5,446,618 | 8/1995 | Tesuya et al. | 361/683 |
| 5,526,226 | 6/1996 | Katoh et al. | 361/680 |
| 5,687,592 | 11/1997 | Penniman et al. | 70/14 |

FOREIGN PATENT DOCUMENTS

| | | |
|---|---|---|
| 2-181288 | 7/1990 | Japan . |
| 8-152937 | 6/1996 | Japan . |

*Primary Examiner*—Leo P. Picard
*Assistant Examiner*—Tung Minh Bui
*Attorney, Agent, or Firm*—Finnegan, Henderson, Farabow, Garrett & Dunner, L.L.P.

[57] ABSTRACT

An electronic apparatus has a housing with a peripheral wall. The peripheral wall has a lock hole in which a lock device is detachably engaged. A receptacle is formed in the housing. The receptacle has an insertion hole formed in the peripheral wall of the housing. The receptacle removably receives a functional component through the insertion hole. A lock member is disposed within the housing. The lock member is movable between a locked position where the lock member is advanced to the receptacle and irremovably locks the functional component in the receptacle and a lock release position where the lock member retreats from the receptacle and unlocks the functional component. The lock member has a first engaging hole which is continuous with the lock hole when the lock member is moved to the locked position and a second engaging hole which is continuous with the lock hole when the lock member is moved to the lock release position. The lock device is detachably engaged in one of the first and second engaging holes through the lock hole.

14 Claims, 9 Drawing Sheets

ELECTRONIC APPARATUS HAVING A LOCKING DEVICE FOR PREVENTING THEFT OF MEMORY CARDS AND DISK DRIVE

BACKGROUND OF THE INVENTION

The present invention relates generally to an electronic apparatus having a receptacle in which a functional component such as a memory card, an I/O card or a floppy disk drive can be mounted, and more particularly to a structure for irremovably locking the functional component in the receptacle by using a lock device for preventing a theft of the apparatus.

There are known so-called "book-type" or "notebook-type" compact portable computers in which PC cards for extending functions can be mounted. The PC card is a peripheral device of a credit-card size. Conventionally, such PC cards have widely been used as memory cards, I/O cards and LAN cards.

The portable computer in which this kind of PC card can be mounted has a box-shaped housing. The housing includes a bottom wall, a top wall and side walls. A keyboard or a tablet for inputting with use of a pen is disposed on the top wall of the housing. The housing has a card receptacle. The card receptacle has a card slot and a card connector for detachable connection with the PC card. The card slot is formed in the side wall of the housing. The card slot is covered by a special cover, except the time for insertion/removable of the PC card.

The conventional portable computer has a security slot. The security slot is used for detachable connection with an antitheft lock device. This slot is formed in the side wall of the housing. The lock device comprises a security cable and a lock cylinder fixed at one end of the security cable. The lock cylinder includes a hook which can be inserted into the slot. The hook is rotatable between a locked position, where the hook is engaged in the slot, and a lock release position where engagement with the slot is released. An operation for rotating the hook is performed by a removable lock key provided in the lock cylinder. After the security cable is coupled to an external fixed object such as a desk, the hook of the lock cylinder is inserted and rotated in the locked position by the lock key. Thus, the portable computer can be fastened to the fixed object by means of the security cable, and a theft of the portable computer is prevented.

Although the conventional lock device can prevent theft of the portable computer, it cannot prevent that of the PC card. The PC card is merely put in the card receptacle in the housing through the card slot. If the cover is opened, anyone can take it out from the card receptacle. Therefore, there is always a possibility that the PC card may be stolen.

In addition, since the PC card can easily be removed from the card receptacle, there is a concern that the PC card would be removed from or inserted in the card receptacle while the portable computer is switched on. As a result, the PC card may be electrically destroyed, and the data stored in the PC card may be lost or malfunction or a fault of the portable computer may be caused.

In order to prevent theft or unintentional removable of the PC card, it may be thought to additionally provide the housing with a device for locking the PC card in the card receptacle. However, modern portable computers have been reduced in size more and more in order to enhance portability, and the inside space of the housing has decreased accordingly. Under the circumstances, it is very difficult to provide a space within the housing for disposing an additional lock device for the PC card. Moreover, the number of parts, as well as the manufacturing cost and weight, of the portable computer will increase because of the provision of the additional lock device.

BRIEF SUMMARY OF THE INVENTION

The present invention has been made in consideration of the above circumstances and its object is to provide an electronic apparatus capable of preventing, without taking special measures, a theft or unintentional insertion/removal of a functional component contained in a receptacle.

In order to achieve the object, an electronic apparatus to which an antitheft lock device is connectable, the apparatus comprising:

a housing having a lock hole in which the lock device is detachably engaged;

a receptacle formed in the housing, the receptacle having an insertion hole formed in the housing, the receptacle receiving removably a functional component through the insertion hole; and a lock member disposed within the housing, the lock member being movable between a locked position where the lock member is advanced to the receptacle and irremovably locks the functional component in the receptacle and a lock release position where the lock member retreats from the receptacle and unlocks the functional component, the lock member having a first engaging hole which is continuous with the lock hole when the lock member is moved to the locked position and a second engaging hole which is continuous with the lock hole when the lock member is moved to the lock release position, the lock device being detachably engaged in one of the first and second engaging holes through the lock hole.

In the above structure, if the lock member is moved to the lock release position, the second engaging hole of the lock member is made continuous with the lock hole of the housing. If the antitheft lock device is engaged in the lock hole, the lock device is hooked in the second engaging hole of the lock member through the lock hole and thus the lock device is connected to the housing of the apparatus. Accordingly, the housing of the apparatus can be fastened to an external fixed object such as a desk by means of the lock device and the theft of the apparatus can be prevented. In this case, the lock member is held in the lock release position by the lock device and retreated from the receptacle. Accordingly, the functional component can be put in the receptacle or removed from the receptacle.

After the functional component is put in the receptacle, if the lock member is moved from the lock release position to the locked position, the lock member advances to the receptacle and irremovably locks the functional component in the receptacle. When the lock member is shifted to the locked position, the first engaging hole of the lock member is made continuous with the lock hole of the housing. Once the lock device is engaged in the lock hole, the lock device is hooked in the first engaging hole of the lock member via the lock hole, and the lock device is connected to the housing of the apparatus. Accordingly, the housing of the apparatus can be fastened to the external fixed object by means of the lock device and the theft of the apparatus can be prevented. In this case, since the lock device is engaged in the first engaging hole of the lock member, the lock member is locked in the locked position. As a result, the removal of the functional component from the receptacle is not permitted, and the theft of the functional component is prevented by using the lock device for securing the apparatus against theft.

In order to achieve the above object, there is provided an electronic apparatus to which a security cable having an antitheft hook is connectable, the apparatus comprising:

a housing of a synthetic resin, the housing having a lock hole in which the hook is detachably inserted;

a receptacle formed in the housing, the receptacle having an insertion hole formed in the housing;

a functional component removably put into the receptacle through the insertion hole; and a lock metal member disposed within the housing, the lock metal member being supported on the housing to be slidable between a locked position where the lock metal member is advanced to the receptacle and irremovably locks the functional component in the receptacle and a lock release position where the lock metal member retreats from the receptacle and unlocks the functional component, the lock metal member having a hook hole which is continuous with the lock hole of the housing when the lock metal member is slid to the lock release position and an engaging hole which is continuous with the lock hole of the housing when the lock metal member is slid to the locked position, the hook being detachably engaged in the engaging hole through the lock hole.

In the above structure, if the lock metal member is slid to the lock release position, the hook hole of the lock metal member is made continuous with the lock hole of the housing. If the hook of the security cable is inserted in the lock hole, the hook is engaged in the hook hole of the lock metal member through the lock hole and thus the security cable is connected to the housing of the apparatus. Accordingly, the housing of the apparatus can be fastened to an external fixed object such as a desk by means of the security cable and the theft of the apparatus can be prevented. In this case, the lock metal member is held in the lock release position by the hook and retreated from the receptacle. Accordingly, the functional component can be put in the receptacle or removed from the receptacle.

After the functional component is put in the receptacle, if the lock metal member is moved from the lock release position to the locked position, the lock metal member advances to the receptacle and irremovably locks the functional component in the receptacle. When the lock metal member is slid to the locked position, the engaging hole of the lock metal member is made continuous with the lock hole of the housing. Once the hook is inserted in the lock hole, the hook is engaged in the engaging hole of the lock metal member via the lock hole, and the security cable is connected to the housing of the apparatus. Accordingly, the housing of the apparatus can be fastened to the external fixed object by means of the security cable and the theft of the apparatus can be prevented. In this case, since the hook is engaged in the engaging hole of the lock metal member, the lock member is locked in the locked position. As a result, the removal of the functional component from the receptacle is not permitted, and the theft of the functional component is prevented by using the hook for preventing the theft of the apparatus and the lock metal member to which the hook is engaged.

In order to achieve the above object, there is provided an electronic apparatus to which an antitheft lock device is connectable, the apparatus comprising:

a housing having a lock hole in which the lock device is detachably engaged;

a plurality of receptacles formed in the housing, the receptacles having insertion holes formed in the housing, the receptacles receiving removably functional components through the insertion holes; and a lock member disposed within the housing, the lock member being movable between a locked position where the lock member is advanced to the receptacles and irremovably locks the functional components in the receptacles and a lock release position where the lock member retreats from the receptacles and unlocks the functional components, the lock member having a first engaging hole which is continuous with the lock hole when the lock member is moved to the locked position and a second engaging hole which is continuous with the lock hole when the lock member is moved to the lock release position, the lock device being detachably engaged in one of the first and second engaging holes through the lock hole.

In the above structure, if the lock member is moved to the lock release position, the second engaging hole of the lock member is made continuous with the lock hole of the housing. If the antitheft lock device is engaged in the lock hole, the lock device is hooked in the second engaging hole of the lock member through the lock hole and thus the antitheft lock device is connected to the housing of the apparatus. Accordingly, the housing of the apparatus can be fastened to an external fixed object such as a desk by means of the lock device and the theft of the apparatus can be prevented. In this case, the lock member is held in the lock release position by the lock device and retreated from the receptacles. Accordingly, the functional components can be put in the receptacles or removed from the receptacles.

After the functional components are put in the receptacles, if the lock member is moved from the lock release position to the locked position, the lock member advances to the receptacles and irremovably locks the functional components in the receptacles. When the lock member is shifted to the locked position, the first engaging hole of the lock member is made continuous with the lock hole of the housing. Once the lock device is engaged in the lock hole, the lock device is hooked in the first engaging hole of the lock member, and the lock device is connected to the housing. Accordingly, the housing can be fastened to the external fixed object such as a desk by means of the lock device and the theft of the apparatus can be prevented. In this case, since the lock device is engaged in the first engaging hole of the lock member, the lock member is locked in the locked position. As a result, the removal of the functional components from the receptacles is not permitted, and the theft of the functional components is prevented by using the lock device for preventing the theft of the apparatus.

In order to achieve the object of the invention, there is provided an electronic apparatus to which an antitheft lock device is connectable, the apparatus comprising:

a housing having a lock hole in which the lock device is detachably engaged;

first and second receptacles formed in the housing, the first and second receptacles having insertion holes formed in the housing, the first and second receptacles receiving removably functional components through the insertion holes; and a lock member disposed within the housing, the lock member being movable selectively among a first locked position where the lock member is advanced to the first receptacle and irremovably locks the functional component in the first receptacle, a second locked position where the lock member is advanced to the first and second receptacles and irremovably locks the functional components in the receptacles, and a lock release position where the lock member retreats from the first and second receptacles and unlocks the functional components, the lock member having a first engaging hole which is continuous with the lock hole when the lock member is moved to the first locked position, a second engaging hole which is continuous with the lock hole when the lock member is moved to the second locked position, and a third engaging hole which is continuous with the lock hole when the lock member is moved to the lock release position, the lock device being detachably engaged in one of the first, second and third engaging holes through the lock hole.

In the above structure, if the lock member is moved to the lock release position, the third engaging hole of the lock member is made continuous with the lock hole of the housing. If the antitheft lock device is engaged in the lock hole, the lock device is hooked in the third engaging hole of the lock member through the lock hole and thus the lock device is connected to the housing of the apparatus. Accordingly, the housing can be fastened to an external fixed object such as a desk by means of the lock device and the theft of the apparatus can be prevented. In this case, the lock member is held in the lock release position by the lock device and retreated from the first and second receptacles. Accordingly, the functional components can freely be put in the receptacles or removed from the receptacles.

After the functional components are put in the first and second receptacles, if the lock member is moved from the lock release position to the first locked position, the lock member advances to the first receptacle and irremovably locks the functional component in the first receptacle. In this case, the lock member merely advances to the first receptacle and retreats from the second receptacle. Thus, the functional component put in the second receptacle is not locked and can freely be removed from the second receptacle. In addition, when the second receptacle is empty, a functional component can be put in the second receptacle.

When the lock member is shifted to the first locked position, the first engaging hole of the lock member is made continuous with the lock hole of the housing. Once the lock device is engaged in the lock hole, the lock device is hooked in the first engaging hole of the lock member, and the lock device is connected to the housing. Accordingly, the housing can be fastened to the external fixed object by means of the lock device and the theft of the apparatus can be prevented. In this case, since the lock device is engaged in the first engaging hole of the lock member, the lock member is locked in the first locked position. As a result, the removal of the functional component from the first receptacle is not permitted.

When the lock member is shifted from the first locked position to the second locked position, the lock member advances to the first and second receptacles and locks the functional components put in these receptacles. If the lock member is shifted to the second locked position, the second engaging hole of the lock member is made continuous with the lock hole of the housing. Once the lock device is engaged in the lock hole, the lock device is hooked in the second engaging hole of the lock member, and the lock device is connected to the housing. Accordingly, the housing can be fastened to the external fixed object by means of the lock device and the theft of the apparatus can be prevented. In this case, since the lock device is engaged in the second engaging hole of the lock member, the lock member is locked in the second locked position. As a result, the removal of the functional components from the first and second receptacles is not permitted.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

A portable computer according to a first embodiment of the present invention will now be described with reference to FIGS. 1 to 9.

Figure 1:
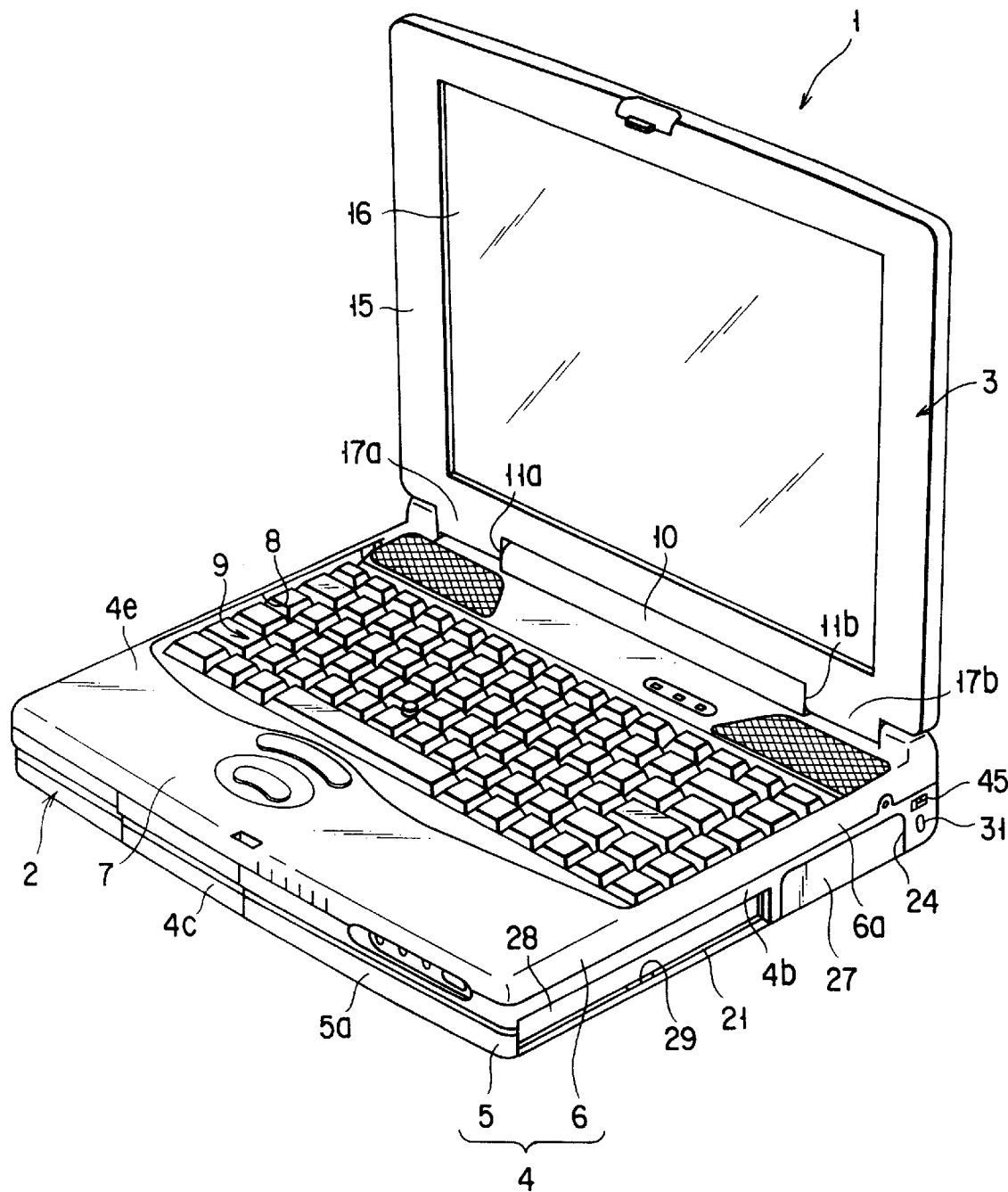
FIG. 1 is a perspective view showing a portable computer according to a first embodiment of the present invention.

FIG. 1 shows a book-type portable computer 1. The portable computer 1 comprises a computer body 2 and a display unit 3 supported on the computer body 2.

The computer body 2 has a housing 4 of a synthetic resin. The housing 4 has a flat box shape, including a bottom wall 4a, right and left side walls 4b (only one being shown), a front wall 4c, a rear wall 4d and a top wall 4e. The housing 4 comprises a lower housing 5 and an upper housing 6 detachably coupled to the lower housing 5. The lower housing 5 includes the bottom wall 4a and four peripheral walls 5a extending upward from a peripheral edge of the bottom wall 4a. The upper housing 6 includes the top wall 4e and four peripheral walls 6a extending downward from a peripheral edge of the top wall 4e. The peripheral walls 5a of lower housing 5 and the peripheral walls 6a of upper housing 6 cooperate to constitute the side walls 4b, front wall 4c and rear wall 4d of housing 4.

The top wall 4e of housing 4 has a palm-rest 7 and a keyboard mounting portion 8. The palm-rest 7 extends in the width direction of the housing 4 at a front end portion of the housing 4. The keyboard mounting portion 8 is situated behind the palm-rest 7. The keyboard mounting portion 8 is formed of a recess retreating toward the bottom wall 4a of housing 4. A keyboard 9 is mounted in the keyboard mounting portion 8. A projecting portion 10 is formed at a rear end portion of the top wall 4e of housing 4. The projecting portion 10 extends in the width direction of the housing 4. The projecting portion 10 has a pair of display support portions 11a and 11b.

The display unit 3 comprises a display housing 15 and a liquid crystal display (LCD) 16 contained in the display housing 15. The display housing 15 has a pair of leg portions 17a and 17b. The leg portions 17a and 17b are situated in the display support portions 11a and 11b of housing 4. Each of the leg portions 17a and 17b is supported on the housing 4 by means of a hinge device (not shown). The display unit 3 is rotatable between a closed position where it covers the palm-rest 7 and keyboard 9 and an open position where it exposes the palm-rest 7 and keyboard 9.

Figure 2:
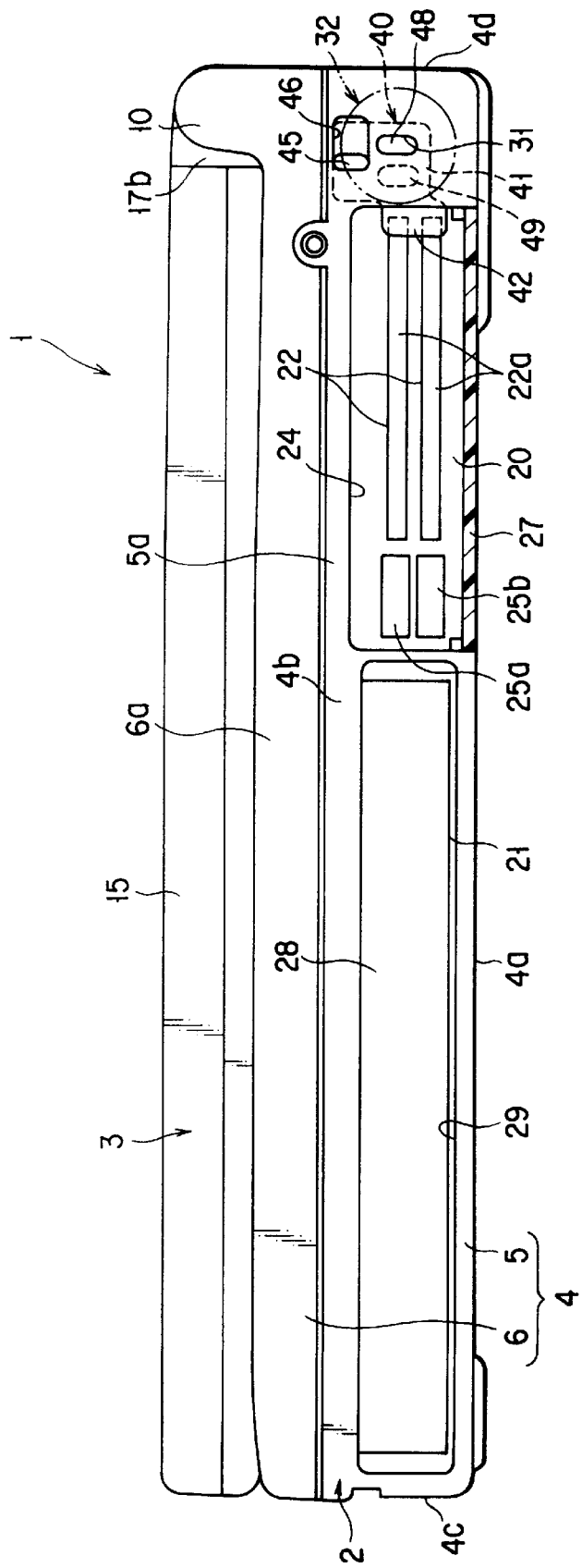
FIG. 2 is a side view of the portable computer, showing the state in which a card cover is opened and PC cards put in a first receptacle are exposed.
Figure 5:
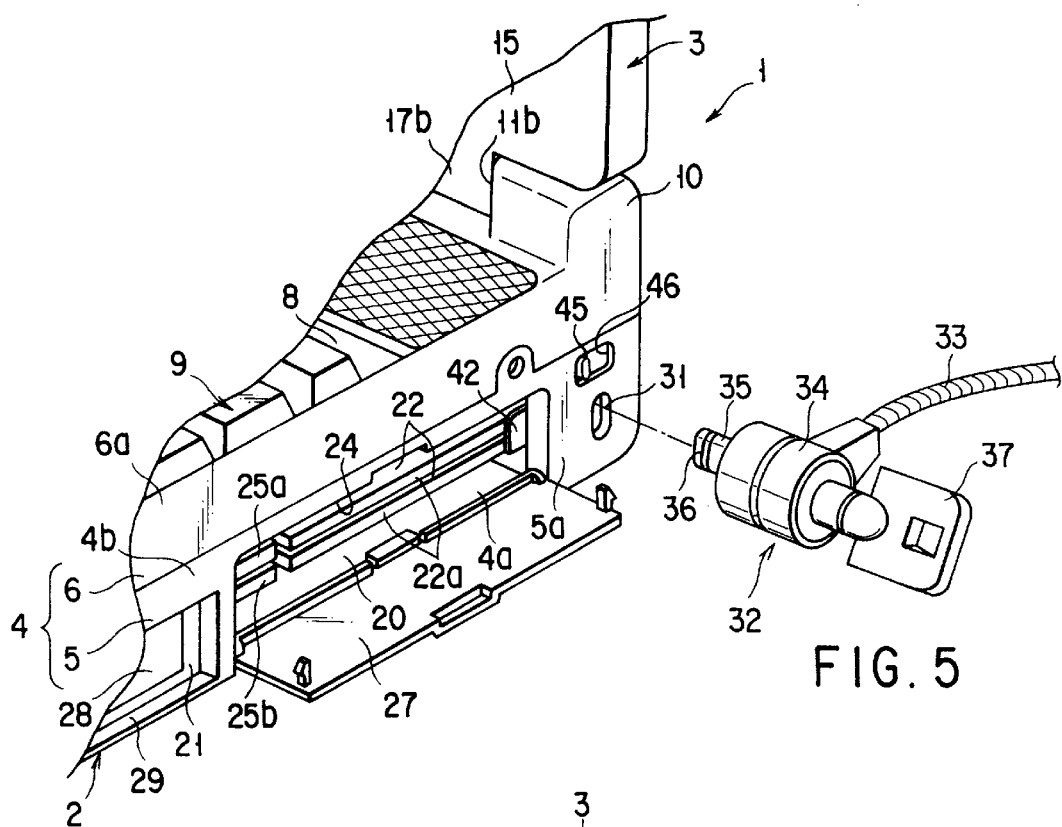
FIG. 5 is a perspective view of the portable computer, showing the relationship between a lock device and a lock hole in the housing.

As is shown in FIGS. 2 and 5 the housing 4 includes a first receptacle 20 and a second receptacle 21. The first and second receptacles 20 and 21 are juxtaposed in the depth direction of housing 4. The first receptacle 20 is situated under the keyboard 9. A plurality of PC cards 22 serving as functional components are removably inserted in the first receptacle 20. The PC cards 22 are peripheral devices of a credit card size, and are widely known as memory cards, I/O cards or LAN cards. The PC cards 22 are arranged within the first receptacle 20 in two stages stacked in the thickness direction of housing 4.

The first receptacle 20 has a first insertion hole 24 and a terminal end portion opposed to the first insertion hole 24. The first insertion hole 24 is opened in the right-hand side wall 4b of housing 4 for the purpose of insertion/removal of the PC cards 22 into/from the first receptacle 20. A card connector (not shown) is disposed at the terminal end portion of the first receptacle 20. The PC cards 22, when inserted into the first receptacle 20, are detachably connected to the card connector. The PC cards 22 have end portions 22a which are exposed to the first insertion hole 24 when inserted into the first receptacle 20.

As is shown in FIGS. 2 and 5, the first receptacle 20 is equipped with a pair of eject levers 25a and 25b. The eject levers 25a and 25b are pushed by the fingertip to eject the PC cards 22 from the first receptacle 20. The eject levers 25a and 25b are disposed inside the first insertion hole 24.

The housing 4 includes a card cover 27. The card cover 27 is supported on the lower housing 5 of housing 4 so as to be rotatable between a first position where the card cover 27 closes the first insertion hole 24 and a second position where it opens the first insertion hole 24. The card cover 27, when rotated to the first position, is continuous with the right-hand side wall 4b of housing 4 and covers the end portions 22a of PC cards 22 and eject levers 25a and 25b.

The second receptacle 21 is located in front of the first receptacle 20. One of pack-shaped devices 28 serving as functional components is selected and detachably mounted in the second receptacle 21. The pack-shaped devices 28 are, for example, a floppy disk drive and a CD-ROM drive. Such drives are packaged as modules respectively.

The second receptacle 21 has a second insertion hole 29 and a terminal end portion opposed to the second insertion hole 29. The second insertion hole 29 is opened in the right-hand side wall 4b of housing 4 for the purpose of insertion/removal of the pack-shaped device 28 into/from the second receptacle 21. The second insertion hole 29 and first insertion hole 24 are juxtaposed in the depth direction of housing 4 along the right-hand side wall 4b of housing 4. A card connector (not shown) is disposed at the terminal end portion of the second receptacle 21. The pack-shaped device 28, when inserted into the second receptacle 21, is detachably connected to the card connector.

As is shown in FIGS. 2 and 5, the housing 4 has a lock hole 31 for security. The lock hole 31 is formed in a rear end portion of the right-hand side wall 4b of housing 4. The lock hole 31 is located adjacent to the first insertion hole 24. The lock hole 31 has an oval shape elongated in the thickness direction of the housing 4.

Figure 6:
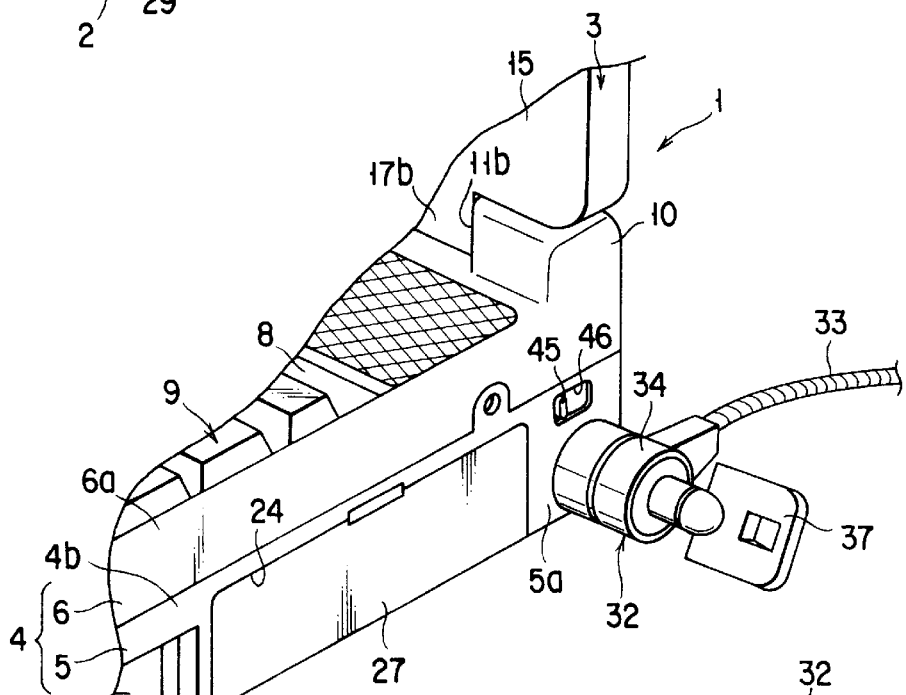
FIG. 6 is a perspective view of the portable computer, showing the state in which the lock device is connected to the housing.
Figure 7:
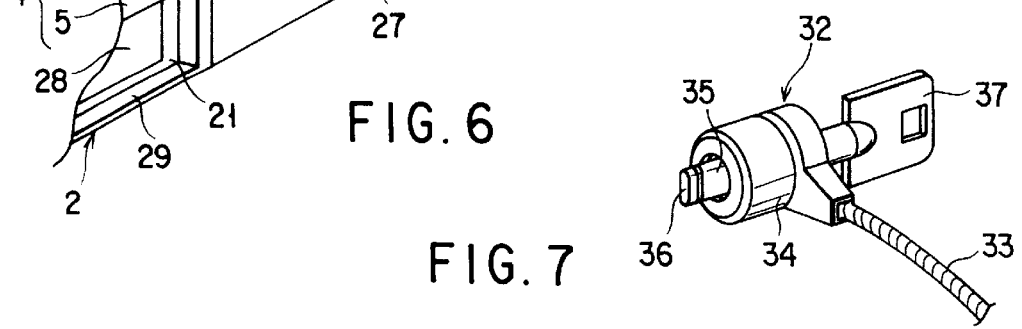
FIG. 7 is a perspective view of the lock device.

As is shown in FIGS. 5 and 6, a lock device 32 for preventing a theft of the portable computer 1 is detachably connected to the lock hole 31. The lock device 32 comprises a firm metallic security cable 33 and a lock cylinder 34 fixed to one end of the cable 33. The lock cylinder 34 includes a shaft portion 35 which is removably inserted into the lock hole 31. The shaft portion 35 has an oval cross-sectional shape so that it may be fitted in the lock hole 31. A hook 36 is provided at a distal end portion of the shaft portion 35. The hook 36 is supported on the shaft portion 35 so as to be rotatable over 90° between a first position where it extends in a direction perpendicular to the longitudinal direction of the shaft portion 35 and a second position where it extends in the longitudinal direction of the shaft portion 35. The lock cylinder 34 has a removable lock key 37. The hook 36 is rotated selectively to the first position or second position by operating the lock key 37.

If the shaft portion 35 of lock cylinder 34 is inserted into the lock hole 31 and then the hook 36 is rotated fro m the second position to the first position, detachably connected to the housing 4 via the lock the security cable 33, which is opposite to the lock cylinder 34, is fastened to an external fixed object such as a desk, which cannot easily be moved, and then the lock cylinder 34 is connected to the lock hole 31 of housing 4, the portable computer 1 can be fastened to the fixed object by means of security cable 33. Therefore, the theft of the portable computer 1 can be prevented.

Figure 3:
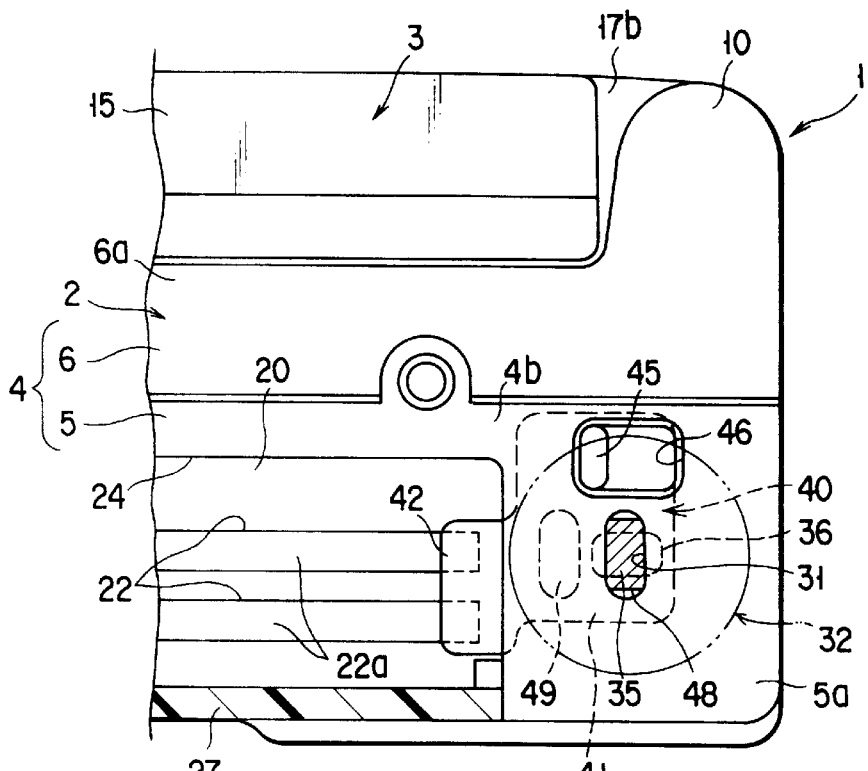
FIG. 3 is a side view of the portable computer, showing the state in which a lock metal member is slid to a locked position.
Figure 4:
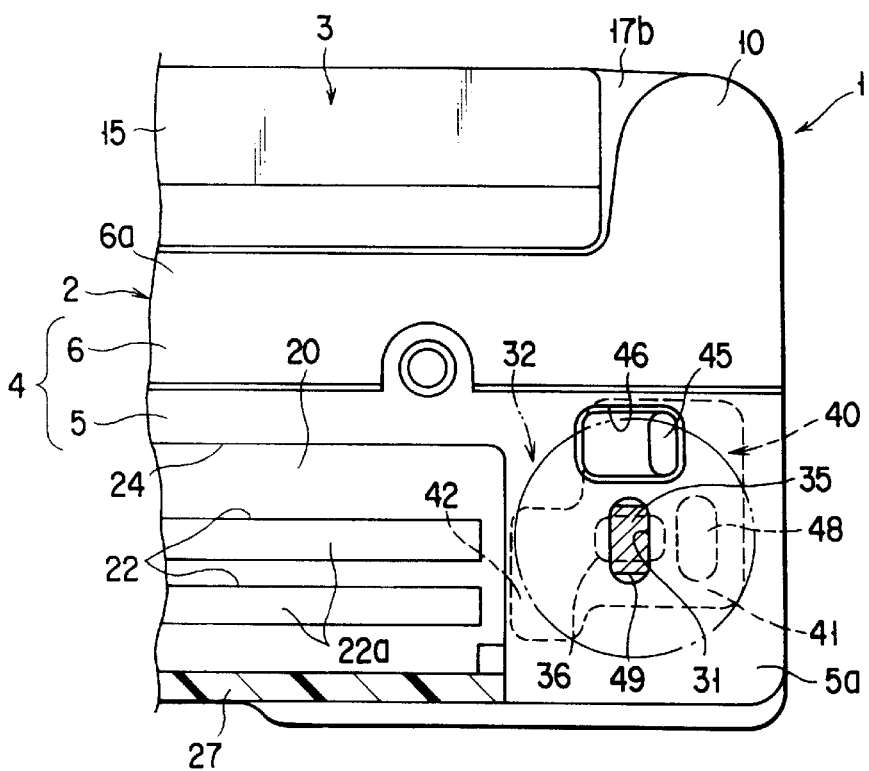
FIG. 4 is a side view of the portable computer, showing the state in which the lock metal member is slid to a lock release position.

As is shown in FIGS. 2 to 4, a lock metal member 40 functioning as a lock member is disposed within the housing 4. The lock metal member 40 has a flat plate-shaped metal body 41. The metal body 41 is disposed in the rear of the first receptacle 20, standing up along the inner surface of the right-hand side wall 4b of housing 4. The metal body 41 integrally includes an engaging portion 42. The engaging portion 42 extends toward the first receptacle 20. The height dimension of the engaging portion 42 is greater than the thickness dimension of the PC card 22.

Figure 8:
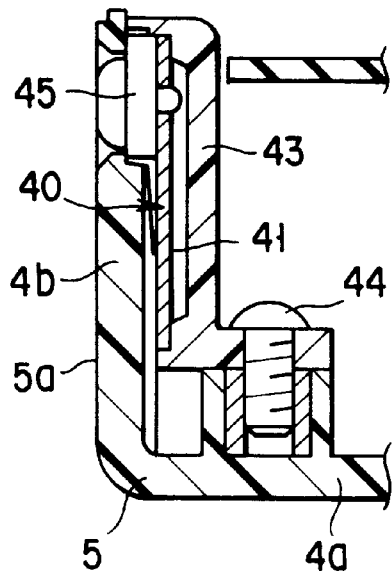
FIG. 8 is a cross-sectional view showing a fixing structure for the lock metal member.
Figure 9:
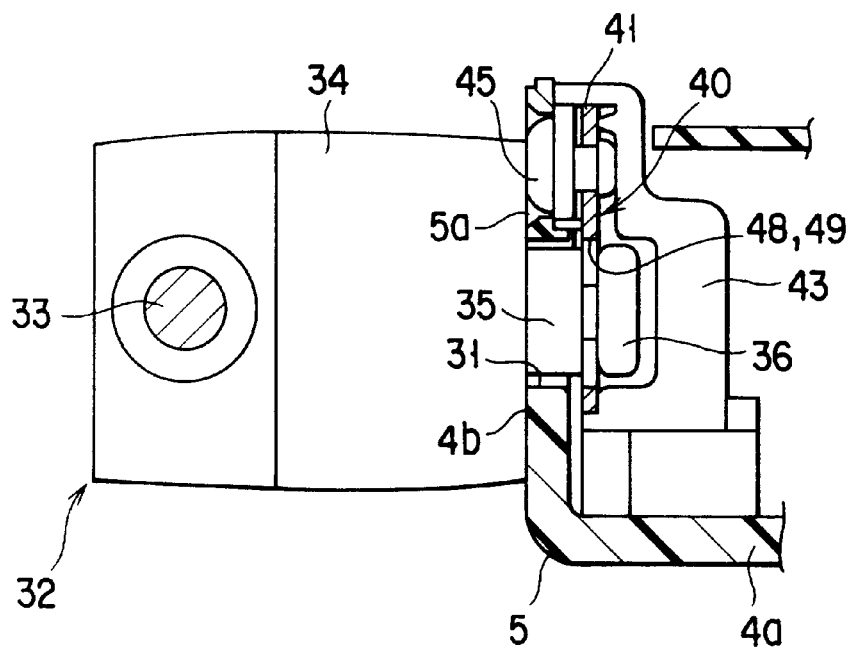
FIG. 9 is a cross-sectional view of the housing, showing the state in which sliding movement of the lock metal member is limited by a hook of the lock device.

As is shown in FIGS. 8 and 9, the lock metal member 40 is supported on the housing 4 by means of a holder 43 of a synthetic resin. The holder 43 is fixed to the bottom wall 4a of housing 4 by means of a screw 44. The holder 43 cooperates with the side wall 4b of housing 4 to slidably clamp the metal body 41. Thus, the lock metal member 40 is supported on the housing 4 slidably between a locked position, where the engaging portion 42 advances to the first receptacle 20, and a lock release position where the engaging portion 42 retreats from the first receptacle 20. If the lock metal member 40 is slid to the locked position, the engaging portion 42 advances to the first insertion hole 24 and faces the end portions 22a of the PC cards 22 received in the first receptacle 20.

The lock metal member 40 has a lever portion 45 of a synthetic resin. The lever portion 45 is exposed out of the housing 4 through an opening portion 46 formed in the side wall 4b. If the lever portion 45 is pushed in the depth direction of housing 4 by the fingertip, the lock metal member 40 is slid to either the locked position or lock release position.

The lock metal member 40 faces the lock hole 31 on the inside of the housing 4. The lock metal member 40 includes a first engaging hole 48 and a second engaging hole 49. The first and second engaging holes 48 and 49 are spaced apart from each other in the direction of sliding of lock metal member 40. Each of the engaging holes 48 and 49 has an oval shape to permit insertion of the hook 36.

As is shown in FIG. 3, when the lock metal member 40 is slid to the locked position, the first engaging hole 48 is continuously with the lock hole 31 of housing 4. When the lock metal member 40 is slid to the lock release position, the second engaging hole 49 is continuous with the lock hole 31 of housing 4, as shown in FIG. 4.

A procedure for connecting the lock device 32 to the housing 4 in the portable computer 1 having the above-described structure will now be described. In the state in which the PC cards 22 are removed from the first receptacle 20, the lock metal member 40 is slid to the lock release position, as shown in FIG. 4. Thereby, the second engaging hole 49 in the lock metal member 40 is made continuous with the lock hole 31 of housing 4, and the lock hole 31 is opened to the inside of the housing 4. In this state, the hook 36 of lock device 32 is rotated to the second position and the hook 36 along with the shaft portion 35 is inserted into the lock hole 31. Thus, the hook 36 is passed into the second engaging hole 49 through the lock hole 31. The lock key 37 is operated to rotate the hook 36 from the second position to the first position. The hook 36 is thus rotated over about 90° and hooked to the opening edge portion of the second engaging hole 49. As a result, the lock metal member 40 is held in the lock release position and the security cable 33 is detachably connected to the housing 4. Accordingly, if the other end of the security cable 33 is connected to, for example, the external fixed object such as a desk, the portable computer 1 can be fastened to the fixed object by means of the security cable 33. Therefore, the theft of the portable computer 1 can be prevented.

In this case, the lock metal member 40 is retained in the lock release position by the hook 36 of lock cylinder 34. As long as the lock metal member 40 is in the lock release position, its engaging portion 42 retreats from the first receptacle 20. Accordingly, the engaging portion 42 does not project into the first insertion hole 24, and the PC cards 22 can be inserted into or removed from the first receptacle 20.

In the state in which the PC cards 22 are put in the first receptacle 20, if the lock metal member 40 is slid from the lock release position to the locked position, the engaging portion 42 of lock metal member 40 advances to the first receptacle 20, as shown in FIGS. 3 and 5, and projects into the first insertion hole 24. Thus, the engaging portion 42 faces the end portions 22a of PC cards 22 put in the first receptacle 20 and shuts off the passage for ejection of the PC cards 22. As a result, the PC cards 22 are prohibited from being ejected from the first receptacle 20. It is therefore possible to prevent the PC cards 22 from being unintentionally taken out of the first receptacle 20.

When the lock metal member 40 is slid to the locked position, as shown in FIG. 3, the second engaging hole 49 is displaced from the lock hole 31 and, in turn, the first engaging hole 48 is made continuous with the lock hole 31. In this state, if the hook 36 of lock cylinder 34, which is rotated to the second position, is inserted into the lock hole 31 in a similar manner with the above case, the hook 36 is passed into the first engaging hole 48. The lock key 37 is operated to rotate the hook 36 from the second position to the first position. The hook 36 is thus rotated over about 90° and hooked to the opening edge portion of the first engaging hole 48. As a result, the lock metal member 40 is held in the locked position and the security cable 33 is detachably connected to the housing 4. Accordingly, the portable computer 1 can be fastened to the fixed object by means of the security cable 33, and the theft of the portable computer 1 can be prevented.

Since the lock metal member 40 is retained in the locked position to shut off the ejection passage of the PC cards 22, the lock metal member 40 cannot be slid to the lock release position unless the lock cylinder 34 is removed from the housing 4. Accordingly, the PC cards 22 cannot be taken out of the first receptacle 20, and the theft of PC cards 22 can be prevented.

Moreover, according to this structure, since the lock metal member 40 is held in the locked position by the antitheft lock device 32 of portable computer 1, there is no need to provide a special lock mechanism for preventing a theft of the PC cards 22. Thus, there is no need to provide a special space within the limited inside space of housing 4 for disposing such a lock mechanism. Therefore, the size and weight of the housing 4 can be decreased and the manufacturing cost of the portable computer 1 can be reduced.

The lock hole 31 of housing 4 is located adjacent to the first insertion hole 24 of first receptacle 20. Accordingly, the size of the lock metal member 40 can be reduced and the sliding stroke of the lock metal member 40 can be decreased. Therefore, the space occupied by the lock metal member 40 within the housing 4 can be reduced as much as possible, and in this respect, too, the size of the housing 4 can be decreased. The present invention is not limited to the above-described first embodiment. A second embodiment of the invention will now be described with reference to FIGS. 10A to 10C.

The second embodiment differs from the first embodiment mainly with respect to the structure of the lock metal member 40. Both embodiments are similar in the other respects. In the second embodiment, the structural elements common to those in the first embodiment are denoted by like reference numerals and a description thereof is omitted.

Figure 10A:
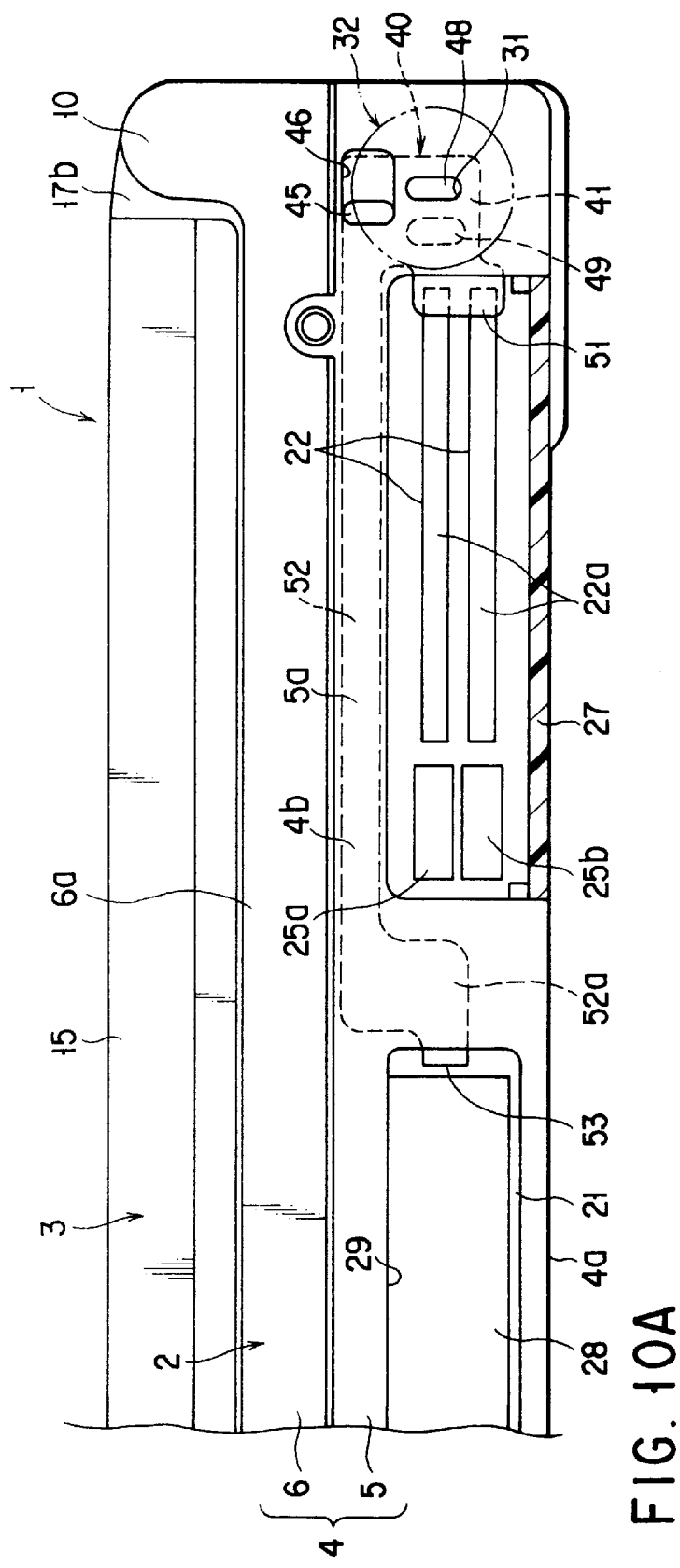
FIG. 10A is a side view of a portable computer according to a second embodiment of the invention, showing the positional relationship between the lock metal member and first and second receptacles of the housing.

As is shown in FIG. 10A, the lock metal member 40 comprises a first engaging portion 51 and an extension 52. The first engaging portion 51 extends toward the first receptacle 20 from the metal body 41. When the lock metal member 40 is slid to the locked position, the first engaging portion 51 projects to the first insertion hole 24. When the lock metal member 40 is slid to the lock release position, the first engaging portion 51 retreats from the first insertion hole 24. The extension 52 extends from the metal body 41 toward the front of the housing 4. The extension 52 is disposed along the right-hand side wall 4b of housing 4 and situated above the first insertion hole 24. A front end portion 52a of the extension 52 is led to a region between the first receptacle 20 and second receptacle 21. The front end portion 52a of extension 52 integrally includes a second engaging portion 53. The second engaging portion 53 extends toward the second receptacle 21. When the lock metal member 40 is slid to the locked position, the second engaging portion 53 projects to the second receptacle 21. When the lock metal member 40 is slid to the lock release position, the second engaging portion 53 retreats from the second receptacle 21.

Figure 10C:
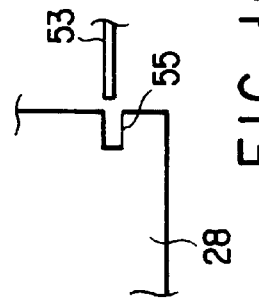
FIG. 10C is a plan view showing the state in which the second engaging portion of the lock metal member is disengaged from the engaging groove of the pack-shaped device.
Figure 10B:
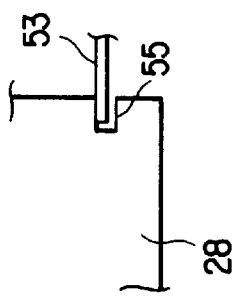
FIG. 10B is a plan view showing the state in which a second engaging portion of the lock metal member is inserted in an engaging groove of a pack-shaped device.

As is shown in FIGS. 10B and 10C, the pack-shaped device 28 received in the second receptacle 21 has an engaging groove 55 as an engaging portion. The engaging groove 55 is associated with the second engaging portion 53 of lock metal member 40. The second engaging portion 53 is removably inserted in the engaging groove 55.

According to this structure, in the state in which the PC cards 22 are put in the first receptacle 20 and the pack-shaped device 28 is put in the second receptacle 21, if the lock metal member 40 is slid from the lock release position to the locked position, the first engaging portion 51 of lock metal member 40 advances to the first receptacle 20 and the second engaging portion 53 advances to the second receptacle 21. Thus, the first engaging portion 51 shuts off the ejection passage of PC cards 22, and the second engaging portion 53 is inserted in the engaging groove 55 of pack-shaped device 28. Therefore, the single lock metal member 40 can prevent both the PC cards 22 and pack-shaped device 28 from being ejected.

In the state in which the lock metal member 40 is slid to the locked position, if the hook 36. of lock device 32 is engaged in the lock hole 31 of housing 4, the lock metal member 40 can be retained in the locked position by the hook 36. Thus, the lock metal member 40 cannot be slid from the locked position to the lock release position. Therefore, the theft of the portable computer 1, as well as the theft of both PC cards 22 and pack-shaped device 28, can be prevented.

Moreover, according to this structure, there is no need to provide a special lock mechanism for preventing a theft of the PC cards 22 and pack-shaped device 28. Therefore, the size and weight of the housing 4 can be decreased and the manufacturing cost of the portable computer 1 can be reduced.

Figure 11A:
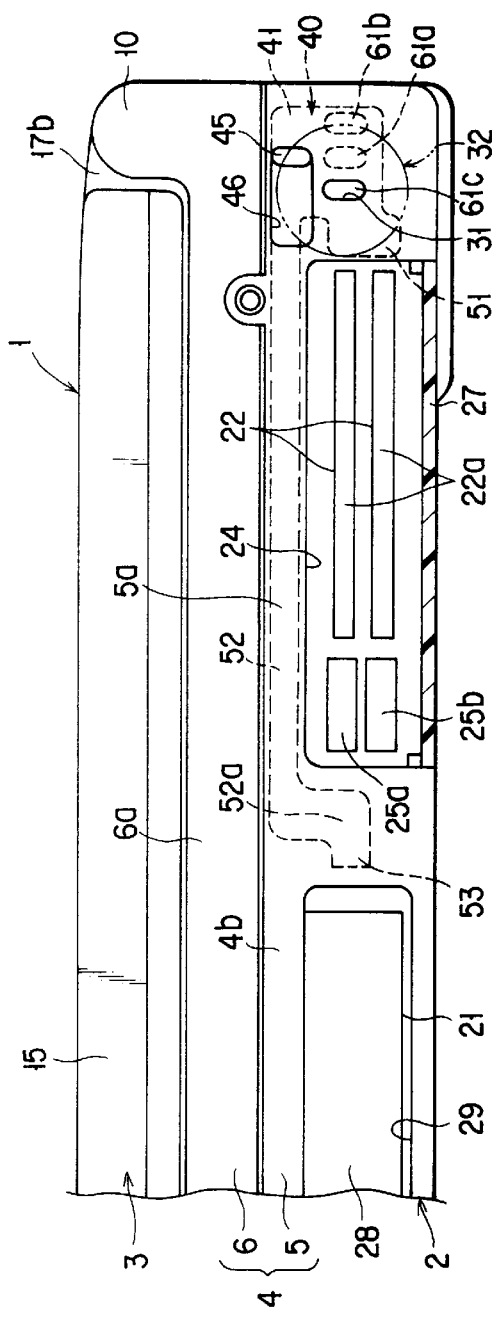
FIG. 11A is a side view of a portable computer according to a third embodiment of the invention, showing the state in which a lock metal member is slid to a lock release position so that the PC cards and the pack-shaped device are unlocked.
Figure 11B:
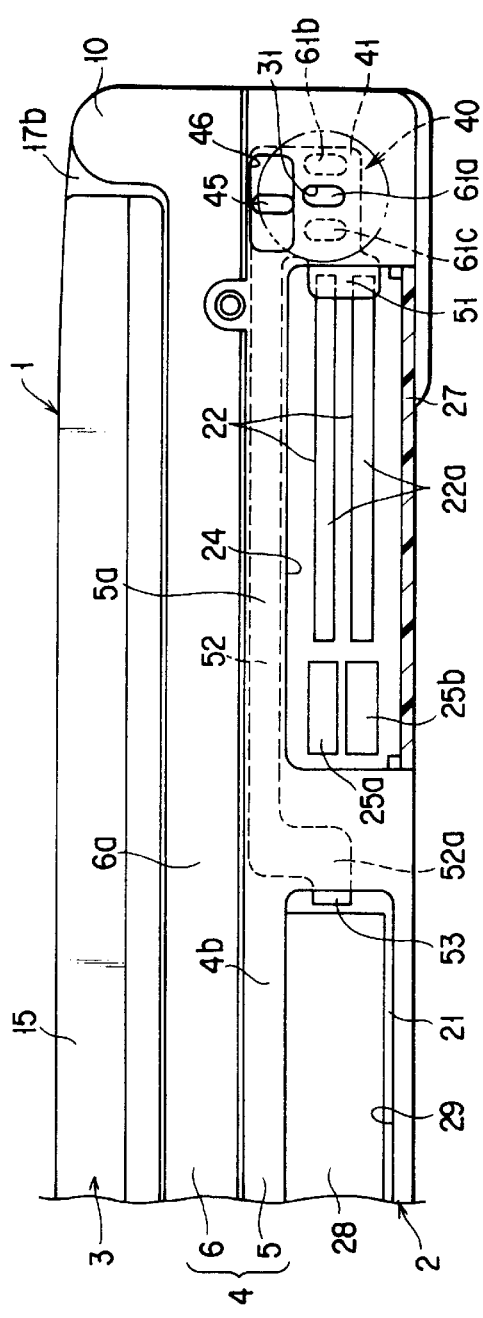
FIG. 11B is a side view of the portable computer, showing the state in which the lock metal member is slid to a first locked position so that the PC cards are locked in the first receptacle.
Figure 11C:
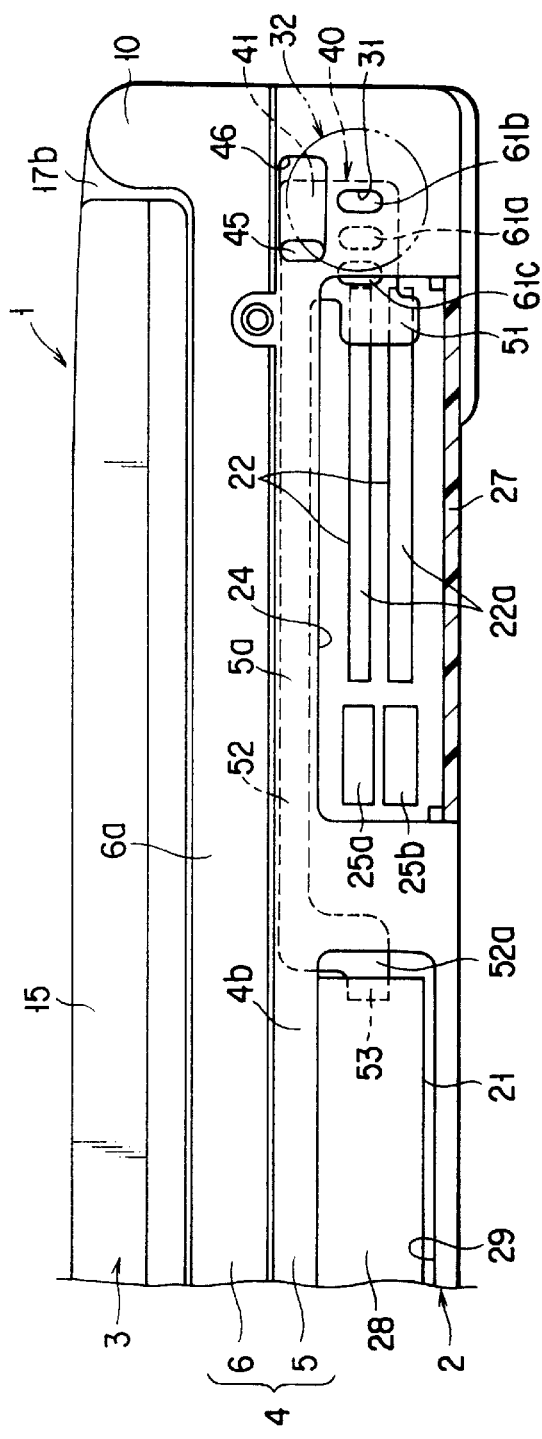
FIG. 11C is a side view of the portable computer, showing the state in which the lock metal member is slid to a second locked position so that the PC cards and pack-shaped device are locked in the first and second receptacles.

FIGS. 11A to 11C show a third embodiment of the present invention.

The third embodiment is a development of the second embodiment. The basic structure of the portable computer 1 is common between the second and third embodiments.

The lock metal member 40 of the third embodiment is supported on the housing 4 so that it can selectively be slid to one of three positions: a first locked position where only the first engaging portion 51 projects to the first receptacle 20, a second locked position where the first and second engaging portions 51 and 53 project to the first and second receptacles 20 and 21, and a lock release position where the first and second engaging portions 51 and 53 retreat from the first and second receptacles 20 and 21.

The metal body 41 of lock metal member 40 has first to third engaging holes 61a to 61c. The engaging holes 61a to 61c are arranged in line at intervals in the direction of sliding of the lock metal member 40. Each of the engaging holes 61a to 61c has an oval shape so that the hook 36 of lock cylinder 34 can be fitted therein.

As is shown in FIG. 11B, when the lock metal member 40 is slid to the first lock position, the first engaging hole 61a is continuous with the lock hole 31 of housing 4. As is shown in FIG. 11C, when the lock metal member 40 is slid to the second lock position, the second engaging hole 61b is continuous with the lock hole 31 of housing 4. As is shown in FIG. 11A, when the lock metal member 40 is slid to the lock release position, the third engaging hole 61c is continuous with the lock hole 31 of housing 4.

In the state in which the lock metal member 40 is slid to one of the first, second and third lock positions, if the hook 36 of lock cylinder 34 is inserted in the lock hole 31 of housing 4 and engaged in an associated one of the first to third engaging holes 61a to 61c, the lock metal member 40 can be immovably locked in the desired position.

According to this structure, the sliding position of the lock metal member 40 can be selected to obtain a locking mode in which PC cards 22 are irremovably locked in the first receptacle 20 and a locking mode in which both PC cards 22 and pack-shaped device 28 are irremovably locked in the first and second receptacles 20 and 21. Thus, while the theft of the portable computer 1 is prevented, one of the receptacles 20 and 21 in/from which the functional component is inserted/removed can be freely chosen. Therefore, the operability of the portable computer 1 is enhanced.

Figure 12:
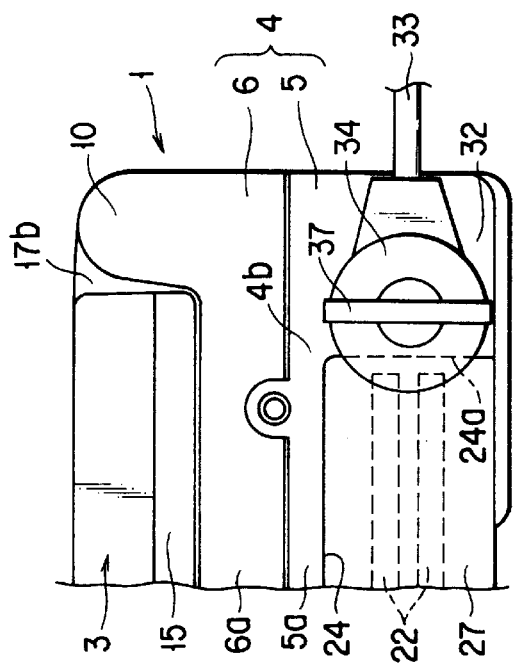
FIG. 12 is a side view of a portable computer according to a fourth embodiment of the invention, showing the state in which a lock device is attached to the housing.
Figure 13:
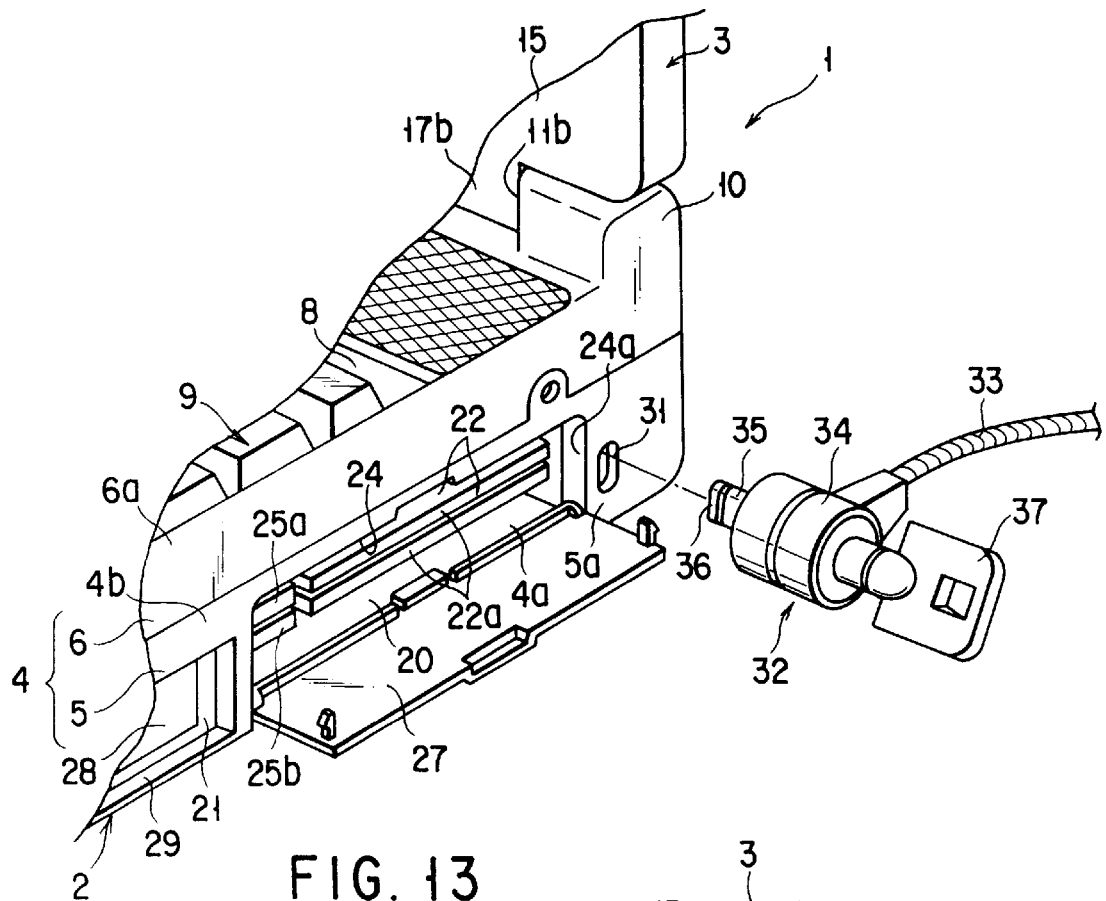
FIG. 13 is a perspective view of the portable computer, showing the positional relationship between the lock device and the lock hole in the housing.
Figure 14:
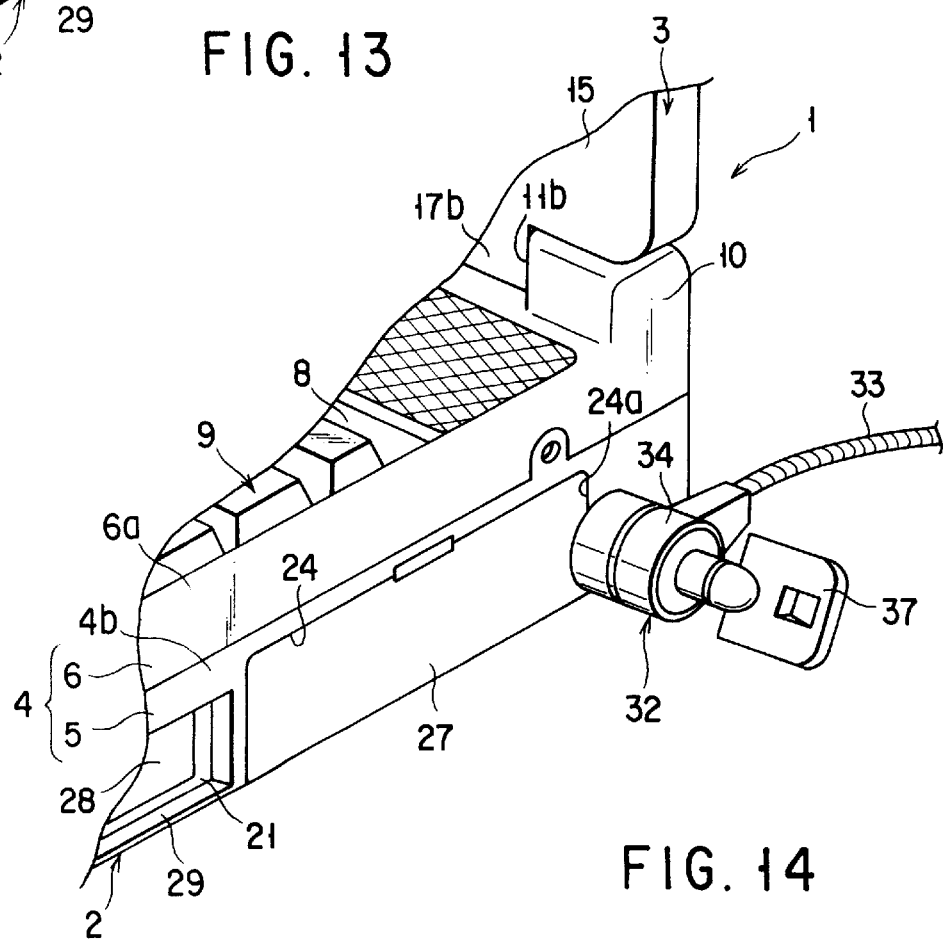
FIG. 14 is a perspective view of the portable computer, showing the state in which the lock device is connected to the housing.

FIGS. 12 to 14 show a fourth embodiment of the invention.

In the fourth embodiment, the lock cylinder 34 of lock device 32 is used to restrict free rotational movement of the card cover 27. The basic structure of the portable computer 1 is common between the first embodiment and the fourth embodiment.

As is shown in FIG. 13, the lock hole 31 of housing 4 is formed adjacent to a side edge 24a of the first insertion hole 24 in the first receptacle 20. The distance between the side edge 24a and lock hole 31 is set to be less than the radius of the lock cylinder 34. When the hook 36 of lock cylinder 34 is connected to the lock hole 31 in the state in which the card cover 27 is rotated to the first position, part of the lock cylinder 34 overlaps the card cover 27.

As long as the lock cylinder 34 is connected to the lock hole 31, the lock cylinder 34 prevents the card cover 27 from rotating to the second position. Thus, the first insertion hole 24 is kept closed by the card cover 27 and the PC cards 22 cannot be removed from the first receptacle 20. Therefore, the theft of PC cards 22 can be prevented by making use of the lock cylinder 34.

In the first embodiment, the housing body is formed of synthetic resin. The present invention, however, is not limited to this embodiment and the housing body may be formed of a light metallic material such as a magnesium alloy.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. An electronic apparatus having an antitheft lock device, the apparatus comprising:

a housing having a lock hole in which the lock device is detachably engaged;

a receptacle formed in the housing, the receptacle having an insertion hole formed in the housing, the receptacle receiving removably a functional component through the insertion hole; and a lock member disposed within the housing and having an engaging portion, the lock member being movable between a locked position where the engaging portion is advanced to the insertion hole of the receptacle and irremovably locks the functional component in the receptacle and a lock release position where the engaging portion retreats from the insertion hole of the receptacle and unlocks the functional component, the lock member having a first engaging hole which is opposed to the lock hole when the lock member is moved to the locked position and a second engaging hole which is opposed to the lock hole when the lock member is moved to the lock release position, the lock device being detachably engaged in one of the first and second engaging holes through the lock hole.

2. The electronic apparatus according to claim 1, wherein said lock member has a lever portion exposed out of the housing, the lever portion being manually operated to move the lock member between the locked position and the lock release position.

3. The electronic apparatus according to claim 1, wherein said lock hole and said insertion hole are adjacent to each other along a peripheral wall of the housing.

4. The electronic apparatus according to claim 1, wherein said functional component is a card-type electronic component, the electronic component having an end portion which is situated at the insertion hole when the electronic component is inserted in the receptacle, the engaging portion of the lock member being opposed to the end portion of the card-type electronic component when the lock member is moved to the locked position.

5. The electronic apparatus according to claim 1, wherein said functional component has an engaging portion which is engaged with the engaging portion of the lock member when the lock member is moved to the locked position.

6. The electronic apparatus according to claim 1, wherein said housing has a cover which is movable between a closed position where the cover closes the insertion hole and an open position where the insertion hole is opened.

7. The electronic apparatus according to claim 1, wherein said lock device comprises:

a lock cylinder;

a hook supported on the lock cylinder and being rotatable between a first position where the hook is engaged with one of the first and second engaging holes of the lock member through the lock hole and a second position where the hook is disengaged from said one of the first and second engaging holes;

a lock key, detachably provided in the lock cylinder, for rotating the hook selectively to one of the first and second positions; and a security cable fixed to the lock cylinder, the cable fastened to an external fixed object.

8. An electronic apparatus having an antitheft lock device, the apparatus comprising:

a housing having a lock hole in which the lock device is detachably engaged;

a plurality of receptacles arranged adjacent to each other within the housing, the receptacles having insertion holes formed in the housing, the receptacles receiving removably functional components through the insertion holes; and a lock member disposed within the housing and having a plurality of engaging portions, the lock member being movable between a locked position where the engaging portions are advanced to the insertion holes of the receptacles and irremovably lock the functional components in the receptacles and a lock release position where the engaging portions retreat from the insertion holes of the receptacles and unlock the functional components, the lock member having a first engaging hole which is opposed to the lock hole when the lock member is moved to the locked position and a second engaging hole which is opposed to the lock hole when the lock member is moved to the lock release position, the lock device being detachably engaged in one of the first and second engaging holes through the lock hole.

9. The electronic apparatus according to claim 8, wherein said lock device comprises:

a lock cylinder;

a hook supported on the lock cylinder and being rotatable between a first position where the hook is engaged with one of the first and second engaging holes of the lock member through the lock hole and a second position where the hook is disengaged from said one of the first and second engaging holes;

a lock key, detachably provided in the lock cylinder, for rotating the hook selectively to one of the first and second positions; and a security cable fixed to the lock cylinder, the cable fastened to an external fixed object.

10. The electronic apparatus according to claim 8, wherein said lock member has a lever portion exposed out of the housing, the lever portion being manually operated to move the lock member between the locked position and the lock release position.

11. The electronic apparatus according to claim 8, wherein said lock member is supported on the housing to be movable in the direction of arrangement of the receptacles, one of the engaging portions advancing to the insertion hole of one of the receptacles when the lock member is moved to the locked position, and the other of the engaging portions advancing to the insertion hole of the other receptacle when the lock member is moved to the locked position.

12. The electronic apparatus according to claim 11, wherein each of said functional components has an end portion which is situated at the associated insertion hole when the functional component is inserted in the associated receptacle, one of the engaging portions of the lock member faces the end portion of the functional component received in the associated receptacle when the lock member is moved to the locked position, and the other engaging portion of the lock member is detachably engaged with the functional component received in the other receptacle when the lock member is moved to the locked position.

13. An electronic apparatus having an antitheft lock device, the apparatus comprising:

a housing having a lock hole in which the lock device is detachably engaged;

first and second receptacles arranged adjacent to each other within the housing, the first and second receptacles having insertion holes formed in the housing, the first and second receptacles receiving removably functional components through the insertion holes; and a lock member disposed within the housing and having first and second engaging positions, the lock member being movable selectively among a first locked position where the first engaging portion is advanced to the insertion hole of the first receptacle and irremovably locks the functional component in the first receptacle, a second locked position where the first and second engaging portions are advanced to the insertion holes of the first and second receptacles and irremovably lock the functional components in the receptacles, and a lock release position where the first and second engaging portions retreat from the insertion holes of the first and second receptacles and unlock the functional components, the lock member having a first engaging hole which is opposed to the lock hole when the lock member is moved to the first locked position, a second engaging hole which is opposed to the lock hole when the lock member is moved to the second locked position, and a third engaging hole which is opposed to the lock hole when the lock member is moved to the lock release position, the lock device being detachably engaged in one of the first, second and third engaging holes through the lock hole.

14. An electronic apparatus having an antitheft lock device, the apparatus comprising:

a housing having a lock hole in which the lock device is detachably engaged;

a receptacle formed in the housing, the receptacle having an insertion hole formed in the housing, the receptacle receiving removably a functional component through the insertion hole;

an eject lever operated when the functional component is ejected out of the receptacle through the insertion hole, the eject lever being disposed within the insertion hole and situated at one end of the insertion hole; and a lock member disposed within the housing, the lock member being situated opposite to the eject lever with the functional component interposed, the lock member having an engaging portion, the lock member being movable between a locked position where the engaging portion is advanced to the insertion hole of the receptacle and irremovably locks the functional component in the receptacle, and a lock release position where the engaging portion retreats from the insertion hole of the receptacle and unlocks the functional component, the lock member having a first engaging hole that is opposed to the lock hole when the lock member is moved to the locked position and a second engaging hole that is opposed to the lock hole when the lock member is moved to the lock release position, the lock device being detachably engaged in one of the first and second engaging holes through the lock hole.

* * * * *